US 6,622,914 B2

(12) United States Patent
Hosogoe

(10) Patent No.: US 6,622,914 B2
(45) Date of Patent: Sep. 23, 2003

(54) CARD SYSTEM, CARD INFORMATION PRESENTATION APPARATUS, CARD ISSUING APPARATUS, CARD CONTENTS UPDATE APPARATUS, CARD DATA UPDATE APPARATUS AND CARD INFORMATION DISTRIBUTION SYSTEM

(75) Inventor: Takashi Hosogoe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/949,874

(22) Filed: Sep. 12, 2001

(65) Prior Publication Data

US 2002/0195487 A1 Dec. 26, 2002

(30) Foreign Application Priority Data

Jun. 21, 2001 (JP) ........................................ 2001-188478

(51) Int. Cl.⁷ ............................ G06K 7/08; G06K 19/06
(52) U.S. Cl. ........................ 235/451; 235/381; 235/492
(58) Field of Search ............................... 235/381, 380, 235/375, 383, 382, 382.5, 379, 492, 486, 451; 705/67, 66, 1, 5

(56) References Cited

U.S. PATENT DOCUMENTS

| 5,162,989 | A | * | 11/1992 | Matsuda ........................ 705/1 |
| 5,396,558 | A | * | 3/1995 | Ishiguro et al. ............... 705/67 |
| 5,446,796 | A | * | 8/1995 | Ishiguro et al. ............... 705/66 |
| 5,502,765 | A | * | 3/1996 | Ishiguro et al. ............... 705/67 |
| 5,530,232 | A | | 6/1996 | Taylor |
| 5,592,400 | A | * | 1/1997 | Sasou et al. ................. 235/375 |
| 5,932,859 | A | * | 8/1999 | Ijichi et al. ................. 235/380 |
| 6,047,270 | A | | 4/2000 | Joao et al. |
| 6,064,990 | A | | 5/2000 | Goldsmith |
| 2001/0029579 | A1 | * | 10/2001 | Kusakabe et al. ........... 713/172 |
| 2001/0034623 | A1 | * | 10/2001 | Chung ............................ 705/5 |
| 2002/0125311 | A1 | * | 9/2002 | Ijichi et al. ................. 235/380 |
| 2002/0195487 | A1 | * | 12/2002 | Hosogoe ....................... 235/380 |

FOREIGN PATENT DOCUMENTS

| EP | 0745961 A2 | 12/1996 |
| EP | 1004992 A2 | 5/2000 |
| JP | HEI 09-323491 | 12/1997 |
| JP | HEI 11-120184 | 4/1999 |
| JP | HEI 11-175726 | 7/1999 |
| WO | WO 98/52160 | 11/1998 |

* cited by examiner

Primary Examiner—Thien M. Le
(74) Attorney, Agent, or Firm—Staas & Halsey LLP

(57) ABSTRACT

The present invention relates to a card system in which a card with memory function capable of rewritably holding a plurality of services (applications), for example, an IC card is installed with a plurality of services (applications) for receiving the service, and the user is informed, briefly and correctly of the card contents. The present invention comprises a card information distribution system which receives information corresponding to a card and controls the received information to thereby transmit the information corresponding to the card to a destination corresponding to the card, and a card information presentation system (portable terminal or the like) for presenting the information transmitted from the card information distribution system.

9 Claims, 6 Drawing Sheets

| | CARD NO. | MEMBER NAME | PERSONALIZED NO. | MAIL ADDRESS | TRANSMISSION TIMING | INSTALLED APPLICATION | CONTENTS OF INSTALLED APPLICATION |
|---|---|---|---|---|---|---|---|
| 1 | 1234 567 ... | SUZUKI TARO | 1234 | ABC@ ..... | EVERYDAY 0:00 | ABC CREDIT | ..... |
| | | | | | | XYZ AIR MILEAGE | ..... |
| | | | | | | RST DEPARTMENT STORE MERCHANDISE COUPON | ..... |
| 2 | ... | ... | ... | ... | ... | ..... | ..... |

Fig. 3

CARD NO.       0123 4567 ........
MEMBER NAME : SUZUKI TARO

| 4/5 | XYZ AIR MILEAGE VER.1.3 | LOADED |
|---|---|---|
| 4/9 | RST DEPARTMENT STORE CAMPAIGN | DELETED |
| 4/11 | ABC CREDIT VER.1.4 | UPDATED |
| ... | ........ | ... |

Fig. 4

```
CARD NO. : 0123 4567 · · · · · · ·
MEMBER NAME : SUZUKI TARO

INSTALLED APPLICATION
(1) ABC CREDIT
(2) XYZ AIR MILEAGE
(3) RST DEPARTMENT STORE
    MERCHANDISE COUPON

UNUSED MEMORY : 25KB

PAGE FOR RECOMMENDED APPLICATION

RECENT USE STATE
```

DISPLAY EXAMPLE OF
APPLICATION INSTALLED IN CARD

Fig. 7

```
CARD NO. : 0123 4567 · · · · · · ·
MEMBER NAME : SUZUKI TARO

APPLICATION NAME : XYZ AIR MILEAGE

MILEAGE : 25,000 MILES (1) TO EXCHANGE THE MILES
    TO A FREE AIR TICKET
(2) TO EXCHANGE THE MILES
    TO A MERCHANDISE COUPON
```

DISPLAY EXAMPLE OF
APPLICATION DATA

Fig. 8

CARD SYSTEM, CARD INFORMATION PRESENTATION APPARATUS, CARD ISSUING APPARATUS, CARD CONTENTS UPDATE APPARATUS, CARD DATA UPDATE APPARATUS AND CARD INFORMATION DISTRIBUTION SYSTEM

BACKGROUND OF THE INVENTION

1. Field of the Invention

The present invention relates to a card system in which a card with memory function capable of rewritably holding a plurality of services (applications), for example, an IC card is installed with a plurality of services (applications) for receiving the service, and a card information presentation apparatus, a card issuing apparatus, a card contents update apparatus, a card data update apparatus and a card information distribution system which constitute the card system.

2. Description of Related Art

Cards have heretofore been used in various applications, such as credit cards, bank's cash cards, membership cards in which points are added depending on the amount of shopping.

These cards have a logo or name for specifying the service that can be received by using the card, printed on the card surface, and users can see the service contents of the card by looking the card.

With the conventional cards, data of, for example, account balance in the case of the bank's cash card, and points in the case of the point card, is displayed or printed out by inserting the card into a balance display unit, or displayed in the shopping receipt.

In most of these conventional cards, a magnetic stripe is embedded, and in many cases, the ID number of the card or a personalized number is recorded in the magnetic stripe. However, the memory capacity of this magnetic stripe is small, and a large amount of data cannot be written therein.

On the other hand, cards with a considerably large memory function have appeared recently, such as IC cards embedded with an IC memory or the like therein, and the memory capacity is greatly increasing.

Under the above described situation, there is considered to utilize a card having a plurality of functions (a card capable of installing a plurality of functions is referred to as a "multi-application card"), by storing a plurality of applications, for example, an application for having a function of a bank's cash card, an application for having a function of a shop's point card, in one card with memory function (represented by an IC card herein).

When considering to build up a system utilizing such multi-application cards, it is desired to build up a system that can add, delete and update the application even after issuance of the card, since if such a multi-application card can be used only for the application written therein at the time of issuing the card, the usefulness thereof is largely spoiled. On the other hand, in utilizing this multi-application card, for example, it can be naturally used as a bank's cash card at the bank's ATM, but it is quite difficult for the ATM to accept roles corresponding to all the applications installable in this multi-application card. Therefore, it is quite difficult to handle various applications installable to the multi-application card by one terminal.

Considering building a system that uses the multi-application cards under such a supposed environment, a large problem is how to inform the user of the card contents accurately.

That is to say, in the case of the multi-application card, since the application in the card can be added, deleted or updated after issuance of the card, it is difficult to print beforehand, on the surface of the card, a display specifying the application installed therein. If users are forced to accurately remember or record which service (application) has been installed in the user's card, the users are forced to bear excessive burdens, thereby easily causing an error or accident, and making the system inconvenient. Even in a case where a function as a bank's cash card and a function as a shop's point card are installed in a user's card, it is difficult to cover all the services by one terminal. Therefore, if the user goes to the bank, the user can find the account balance by using the function of the card as the cash card, but cannot find the shop's points. When the user wants to know the shop's points, it is necessary to operate a terminal in that shop or a terminal controlled by the shop's union. As described above, it is not convenient if the user can obtain the current data related to the card only in odd scraps.

SUMMARY OF THE INVENTION

In view of the above situation, it is an object of the present invention to provide a card system adopting multi-application cards and having a function of informing users of the information related to the card simply and accurately, and a card information presentation apparatus, a card issuing apparatus, a card contents update apparatus, a card data update apparatus and a card information distribution system which constitute such a card system.

In order to achieve the above object, the card system of the present invention comprises:

- a card issuing system for writing at least card identification information for identifying cards, in a card with memory function capable of holding a plurality of applications rewritably;
- a card contents update system for performing addition, deletion and update of an application in the card issued by the card issuing system;
- a card data update system for updating the data of an application held in the card issued by the card issuing system;
- a card information distribution system for receiving information corresponding to the card issued by the card issuing system, from the card issuing system, the card contents update system and the card data update system to control the received information, and transmitting the information corresponding to the card to a destination corresponding to the card; and
- a card information presentation system for presenting the information transmitted from the card information distribution system.

Here, the above-described "information corresponding to the card" may be the card information itself, or a name or a nickname of the card information (for example, an application), and need only be the information capable of identifying the card information. Also, the above "information corresponding to the card" may be the information held in the card, however, it is not limited thereto, and may be the information held outside the card, for example, a host machine, corresponding to the card.

The card system of the present invention comprises the above-described structure, so that the card information distribution system controls the card information and transmits the information to the card information presentation system for presentation, and with this system, the card information can be simply seen without performing an operation including handling of the card, such as inserting the card to a terminal.

The card information presentation apparatus for achieving the above object comprises: an information receiving section for receiving information corresponding to a card, which is transmitted from a card information distribution system which receives the information corresponding to the card with memory function capable of rewritably holding a plurality of applications to control the received information and transmits the information corresponding to the card to a destination corresponding to the card; and an information presentation section for presenting information corresponding to the card, which is received by the information receiving section.

As this card information presentation apparatus, personal computers connected to the Internet and portable terminals such as mobile phones can be typically used.

The information presentation means in the card information presentation apparatus of the present invention may be one displaying the information on a display screen or one transmitting the information by voice.

In the card information presentation apparatus of the present invention, further comprising an information transmission requesting section for requesting the transmission of information corresponding to the card to the card information distribution system, the information receiving section may be a section for receiving the information transmitted from the card information distribution system, in response to the information transmission request from the information transmission requesting section, or may be a section for receiving the information transmitted in accordance with a transmission schedule registered in advance in the card information distribution system.

Moreover, a card issuing apparatus of the present invention for achieving the above object comprises a card issuing section for writing at least card identification information for identifying cards, in a card with memory function capable of rewritably holding a plurality of applications, and an information transmission section for transmitting information corresponding to the card having card identification information written therein by the card issuing section toward a card information distribution system which receives the information corresponding to the card to control the received information and transmits the information corresponding to the card to a destination corresponding to the card.

As described above, by comprising the information transmission section that transmits the information corresponding to the card having the card identification information written therein by the card issuing section to the card information distribution system, it becomes possible to inform the user of the information corresponding to the card through the card information distribution system.

A card information update apparatus of the present invention for achieving the above object comprises: a card contents update section for performing addition, deletion and update of an application, in a card with memory function capable of rewritably holding a plurality of applications, and having at least card identification information for identifying cards written therein; and an information transmission section for transmitting information representing the update contents of the application in the card updated by the card contents update section, toward the card information distribution system which receives the information corresponding to the card to control the received information and transmits the information corresponding to the card to a destination corresponding to the card.

As described above, by comprising the information transmission section that transmits the information for specifying the change contents to the card information distribution system, in the case where addition, deletion or update of the application in the card is performed by the card contents update section, it is possible to inform the user of the information representing the change contents of the application in the card performed by the card contents update apparatus, through the card information distribution system.

A card data update apparatus of the present invention for achieving the above object comprises: a data update section for updating the data of an application held in a card with memory function capable of rewritably holding a plurality of applications; and an information transmission section for transmitting information representing the update contents of the application data held in the card updated by the data update section, toward the card information distribution system which receives the information corresponding to the card to control the received information and transmits the information corresponding to the card to a destination corresponding to the card.

This card data update apparatus typically corresponds to ATMs (Automatic Teller Machine) in banks, point recording apparatus arranged at the payment counter in shops, or the like.

According to this card data update apparatus, by comprising the information transmission section which transmits the information representing the update contents of the data updated by the data update section to the card information distribution system, the update contents of the data updated by this card data update apparatus can be provided to users through the card information distribution system.

Moreover, a card information distribution system of the present invention for achieving the above object comprises: an information control section for receiving the information corresponding to a card with memory function capable of rewritably holding a plurality of applications to control the received information; and an information transmission section for transmitting the information controlled in the information control section to a destination corresponding to the card.

By incorporating such a card information distribution system in the whole system which uses the multi-application card, even in the case where a plurality of applications are held in the card, the user can uniformly and easily receive the information related to the own card.

In the above-described card information distribution system of the present invention, the information control section comprises a plurality of dispersed parts, and the information transmission section may be one for receiving the information controlled by each part in the information control section via a communication line, and transmitting the information to a destination corresponding to the card.

Thus, the card information distribution system of the present invention need not be the one concentrated in one spot, and may be dispersed.

As described above, according to the present invention, card information can be obtained through a route separate from the card itself, and the whole contents of the application in the card can be obtained easily and uniformly.

BRIEF DESCRIPTION OF THE DRAWINGS

FIG. 3 is a table showing one example of contents for each card controlled in the card information distribution system in FIG. 2;

FIG. 4 is a table showing historical data controlled by the card information distribution system in FIG. 2;

FIG. 7 is a diagram showing a screen example displayed on a display screen of a portable terminal at the time of inquiring the card information;

FIG. 8 is a diagram showing a screen example displayed on a display screen of a portable terminal at the time of inquiring the card information.

DETAILED DESCRIPTION OF THE INVENTION

Embodiments of the present invention will now be described.

Figure 1:
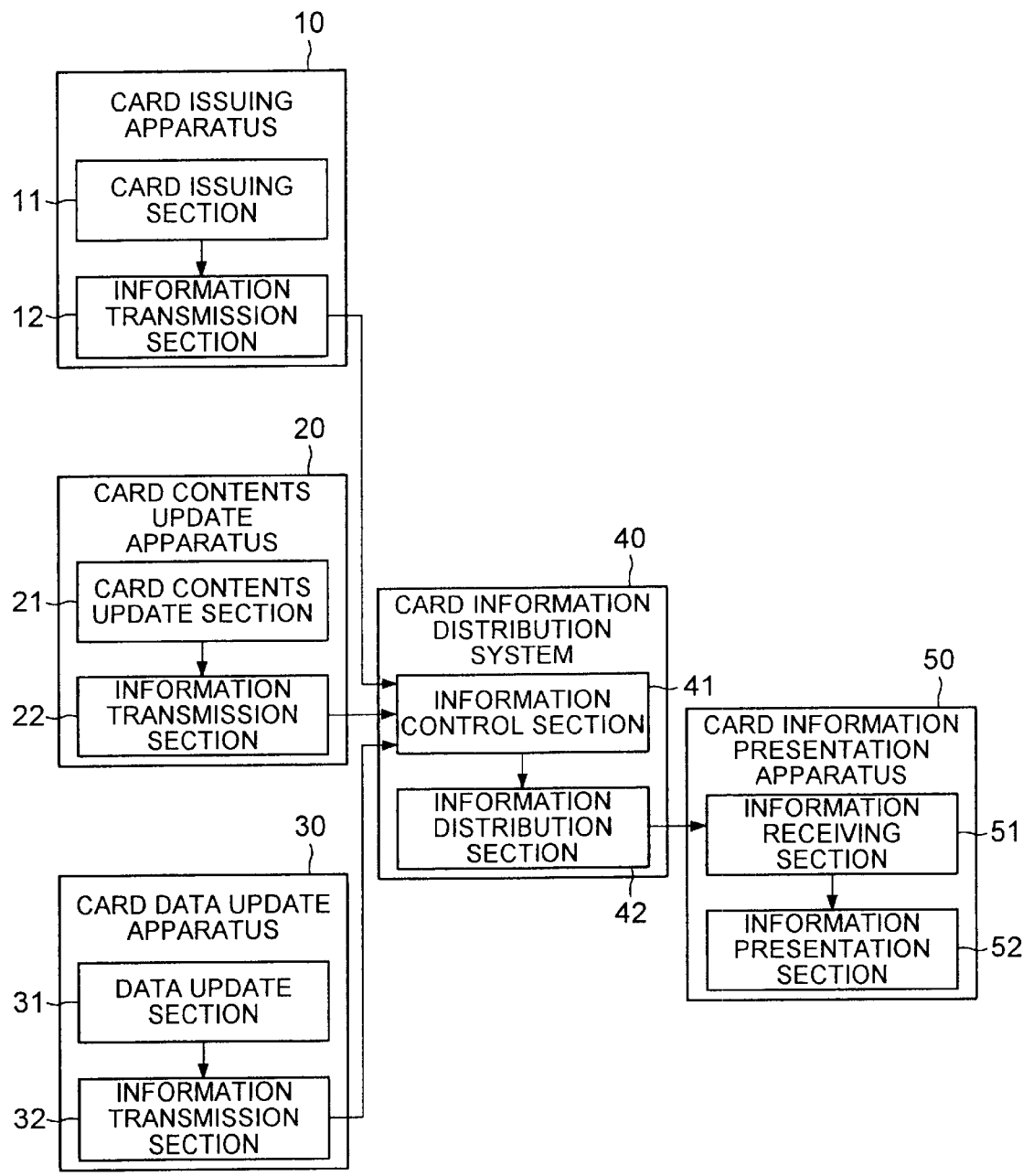
FIG. 1 is a block diagram showing a basic embodiment of a card system according to the present invention.

FIG. 1 is a block diagram showing a basic embodiment of a card system according to the present invention.

The card system 1 shown in this FIG. 1 comprises a card issuing apparatus 10, a card contents update apparatus 20, a card data update apparatus 30, a card information distribution system 40 and a card information presentation apparatus 50, which show one embodiment of the present invention, respectively. Here, the card issuing apparatus 10 is not limited to one, and may be present in plural numbers. The card contents update apparatus 20 and the card data update apparatus 30 are respectively provided in plural numbers, but one each is shown herein as a representative.

The card information distribution system 40 is shown in this figure as one apparatus, and may be constituted by one apparatus as shown herein, but may be dispersed within the card system 1, so long as satisfying the function described below.

The card information presentation apparatus 50 are present in plural numbers, but is represented by one apparatus herein.

The card issuing apparatus 10 is one example of the card issuing system in the card system of the present invention, and the card issuing apparatus 10 comprises herein a card issuing section 11 and an information transmission section 12. In the card issuing section 11, at least card identification information for identifying cards is written in a card with memory function capable of rewritably holding a plurality of applications (multi-application card). Typically, the application in accordance with the purpose of using the card, which the card user is considering (which has been applied for at the time of applying for issuance of the card by the user) is written therein. Write in of this application need not be performed at the time of issuing the card, and may be written later, using the card contents update apparatus 20.

The information transmission section 12 transmits the card identification information 40 written in the card by the card issuing section 11, for example, in this embodiment, the ID number of the card, the name of a user who has applied for the issuance of the card, information such as a personalized number to be used when the user uses this card, the name of application for specifying the application written in the card at the time of issuing the card, the version information and the like.

The card contents update apparatus 20 is one example of a card contents update system in the card system of the present invention, and this card contents update apparatus 20 comprises a card contents update section 21 and an information transmission section 22. In the card contents update section 21, addition, deletion or change of an application is performed in the multi-application card issued by the card issuing apparatus 10 (in which at least card identification information is written). The information transmission section 22 transmits the information for specifying the change contents of the application in the card, for example, the application name, version information, and explanation of directions, according to need, to the card information distribution system 40.

The card data update apparatus 30 corresponds to one example of a card data update system in the card system of the present invention. This card data update apparatus 30 comprises a data update section 31 and an information transmission section 32. In the data update section 31, the application data held in the card is updated, with respect to the multi-application card issued by the card issuing apparatus 10 and having applications held therein.

Here, the "application data" may be data stored in the card itself, but need only be data handled by the application in the card, including data which is not stored in the card itself, but stored in, for example, a host machine or the like. For example, data related to the balance of a bank account corresponding to the card, in the case where an application giving a function as a cash card of a bank is held in the multi-application card, or points data in the case where an application for adding points is held in the multi-application card, adapted to a system in which points are given corresponding to the shopping amount in a shop to provide some service depending on the accumulated points is not necessarily recorded in the multi-application card, and may be recorded in the host machine in the bank or a computer in the shop.

In this case, a balance inquiry function of the host machine in the bank or a point inquiry function of a computer in the shop may be included in the card information distribution system 40. As described above, the card information distribution system 40 may be a dispersed type.

The information transmission section 32 of the card data update apparatus 30 shown in FIG. 1 transmits the information specifying the update contents of the application data held in the multi-application card by means of the data update section 31 (for example, account balance or points), to the card information distribution system 40.

Moreover, the card information distribution system 40 directly corresponds to the card information distribution system in the present invention. Here, this card information distribution system 40 comprises an information control section 41 and an information distribution section 42. The information control section 41 has a role of receiving the above-described respective information from each of the card issuing apparatus 10, the card contents update apparatus 20 and the card data update apparatus 30, and controlling the received information. A specific example will be described later. The information distribution section 42 has a role of transmitting the information controlled by the information control section 41 to a destination (the card information presentation apparatus 50) corresponding to the card. As described above, this card information distribution system 40 may be a dispersed type. For example, the information control section 41 may be arranged for each bank or for each shop, which has joined this card system. In this case, the information distribution section 42 receives the information to be transmitted to a destination corresponding to the card, the information controlled by the information control section 41, via a communication line.

The card information presentation apparatus 50 constituting the card system 1 shown in FIG. 1 comprises an information receiving section 51 and an information presentation section 52. This card information presentation apparatus 50 corresponds to one example of the card information presentation system in the card system of the present invention.

This card information presentation apparatus 50 is operated by a card user, and in this card information presentation apparatus 50, the information related to the card of the user is received by the information receiving section 51 from the card information distribution system 40, and the information received by the information receiving section 51 is presented by the information presentation section 52 (displayed or output by voice herein).

Further, a specific embodiment will be described.

Figure 2:
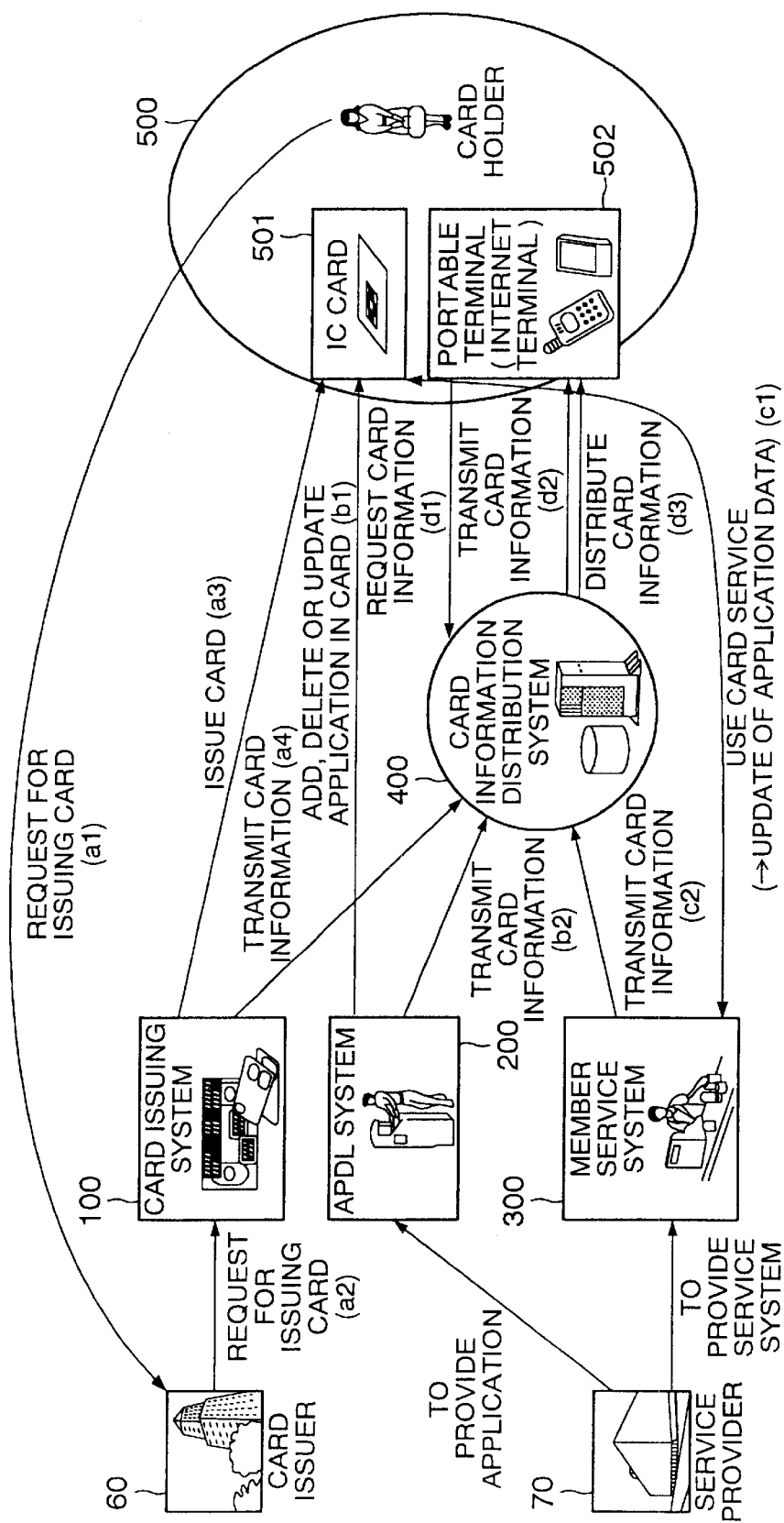
FIG. 2 is a diagram showing the information flow in the card system.

FIG. 2 is a diagram showing the information flow in the card system.

A user 500 requests a card issuer 60 to issue an IC card (a1), and the card issuer 60 receives this request and requests a card issuing system 100 to issue an IC card (a2). The card issuing system 100 receives this request and issues an IC card 501 (a3), and transmits the information in the IC card to a card information distribution system (a4).

Here, at the time of issuing the IC card, the card issuing system 100 writes the card identification information for identifying cards and an application which the user wants to have at the time of issuance of the IC card (which the user has applied for) in the card.

When the user 500 wants to use the IC card 501 for a new purpose (addition of application), or wants to eliminate a service which he/she utilizes up to now (deletion of application), or wants to update to a newly enhanced service (application), even if it is the same service (application) (update of application, for example, version up), the user 500 operates an APDL system (service addition/deletion/update system) which handles the application provided from a service provider 70 to perform addition, deletion or update of application within his/her IC card 501 (b1). At this time, the APDL system 200 transmits the contents of addition, deletion or update thereof to the card information distribution system 400. This APDL system 200 may be integrally constituted with a member service system described below.

The user 50 uses the member service system 300 to receive a service provided by the service provider 70. The member service system 300 specifically stands for an ATM (automatic teller machine) of a bank, or a point adding device in a shop. When the user utilizes the card service by this member service system 300 (c1), the application data written in the user's card is updated by the member service system 300, and the card information is transmitted to the card information distribution system 400, at the same time, by the member service system 300.

In the card information distribution system 400, the information transmitted respectively from the card issuing system 100, the APDL system 200 and the member service system 300 are received, and the received information is controlled for each card. With this card information distribution system 400, use history is also controlled for each card.

FIG. 3 is a table showing one example of information for each card controlled in the card information distribution system in FIG. 2.

Here, the card number, member's name (user name), a personalized number, a mail address, transmission timing, an installed application, and contents of the installed application are recorded. The member's name, the personalized number, the mail address and the like are registered at the time of issuing the card. This table is renewed every time new information is received.

FIG. 4 is a table showing historical data for each card controlled by the card information distribution system 400 in FIG. 2. In FIG. 4, historical data related to a representative one card is shown.

In FIG. 4, with regard to a card specified by the card number or member's name (user name), it is shown that on April 5th, an application having a name of "XYZ Air Mileage", version 1.3 was loaded in this card, on April 9th, an application having a name of "RST Department Store campaign" was deleted from the card, and on April 11th, an application having a name of "ABC Credit" held in the card was updated to version 1.4.

Description is continued, with reference to FIG. 2 again.

The user 500 holds, for example, a portable terminal 502 of a mobile phone in addition to the IC card 501, and the user 500 operates this portable terminal 502, to request to send his/her card information (d1), and the card information distribution system 400 transmits the card information of the user toward the user's portable terminal 502, in response to the request (step d2).

The user 500 receives the information with the portable terminal 502, and can confirm the information of his/her card by displaying the information on a display screen of the portable terminal 502.

In the table shown in FIG. 3, "transmission timing" is also recorded. This is set by the user, and in the example shown here, it is set to be "everyday 0:00". This is to instruct to transmit the card information of the user to the portable terminal of the user 200 at 0:00 everyday, and the card information distribution system in FIG. 2 transmits the card information of each user to the portable terminal of each user, according to the "transmission timing" of each card, even if there is no transmission request from the user (d3).

FIG. 5 to FIG. 8 are diagrams showing screen examples displayed on a display screen of a portable terminal at the time of inquiring the card information.

Figure 5:
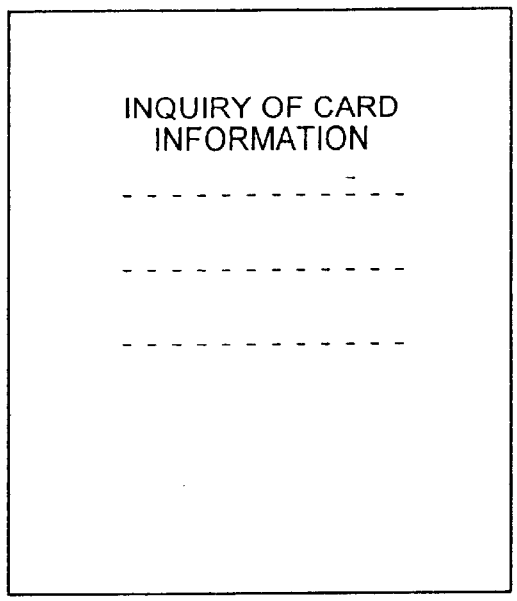
FIG. 5 is a diagram showing a screen example displayed on a display screen of a portable terminal at the time of inquiring the card information.

FIG. 5 shows a screen example at the time when the user 500 operates his/her portable terminal 502 to request transmission of the information of his/her own card.

Here, an item of "Inquiry of card information" is selected from a plurality of items arranged in a row.

Figure 6:
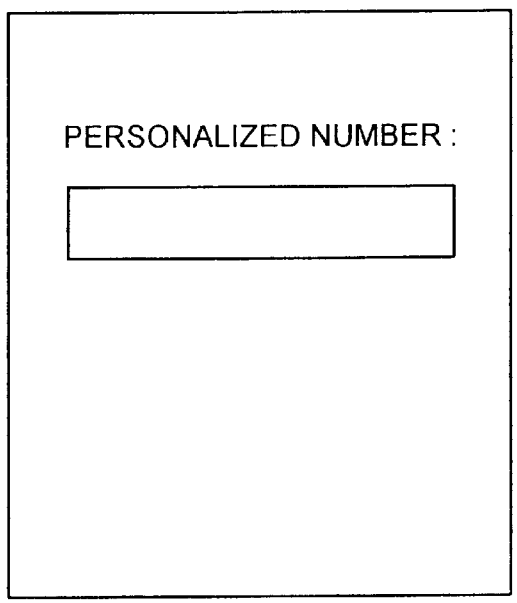
FIG. 6 is a diagram showing a screen example displayed on a display screen of a portable terminal at the time of inquiring the card information.

FIG. 6 shows an example of a personalized number input screen displayed on the portable terminal, following the screen in FIG. 5. When the item of "Inquiry of card information" shown in FIG. 5 is selected, subsequently, the personalized number input screen shown in FIG. 6 is displayed. When the personalized number is input, transmission request of the card information is transmitted to the card information distribution system 400 in FIG. 2.

FIG. 7 is a diagram showing a display screen of the information transmitted from the card information distribution system 400.

As described above, when a correct personalized number is input to transmit the transmission request of the card information, in the card information distribution system 400, the card information of the user is prepared and transmitted to the portable terminal of the user, and an information list screen of the user's card, as shown in FIG. 7 as an example, is displayed on the portable terminal of the user.

On the screen shown in FIG. 7, there are displayed a card number "0123 4567 . . . ", member's name "Suzuki Taro", installed application "(1) ABC Credit, (2) XYZ Air mileage, (3) RST Department Store Merchandise Coupon", unused memory "25 Kb", "page for recommended application" for advertising an application, and "recent use state" for inquiring the historical information (see FIG. 4).

FIG. 8 shows one example of more detailed card information display screen.

FIG. 8 shows a screen when "(2) XYZ Air mileage" is selected on the display screen in FIG. 7. When "(2) XYZ Air mileage" is selected on the display screen in FIG. 7, the present detailed contents of the user for "(2) XYZ Air mileage are displayed", as shown in FIG. 8.

On the screen in FIG. 8, in addition to the common information as the screen in FIG. 7, that is, the card number and the member's name, there are displayed, as the application name, "XYZ Air mileage", as the information of the mileage (points), "25,000 miles", and services of the mileage, "(1) to exchange the miles to a free air ticket" or "(2) to exchange the miles to a merchandise coupon". When "(1) to exchange the miles to a free air ticket" or "(2) to exchange the miles to a merchandise coupon" is selected, the portable terminal is connected to a site for executing a procedure for exchanging the mileage to a free air ticket, or a site for executing a procedure for exchanging the mileage to a merchandise coupon, of the services provided by the XYZ Airlines, which is one of the service providers 70 in FIG. 2.

The user can see that his/her own mileage at present is 25,000 miles, from the screen in FIG. 8.

Here, description is made for a case where the user operates the portable terminal, but the terminal operated by the user is not limited to a portable type, and for example, the user may use a desktop type personal computer installed at home to receive the card information.

Figure 9:
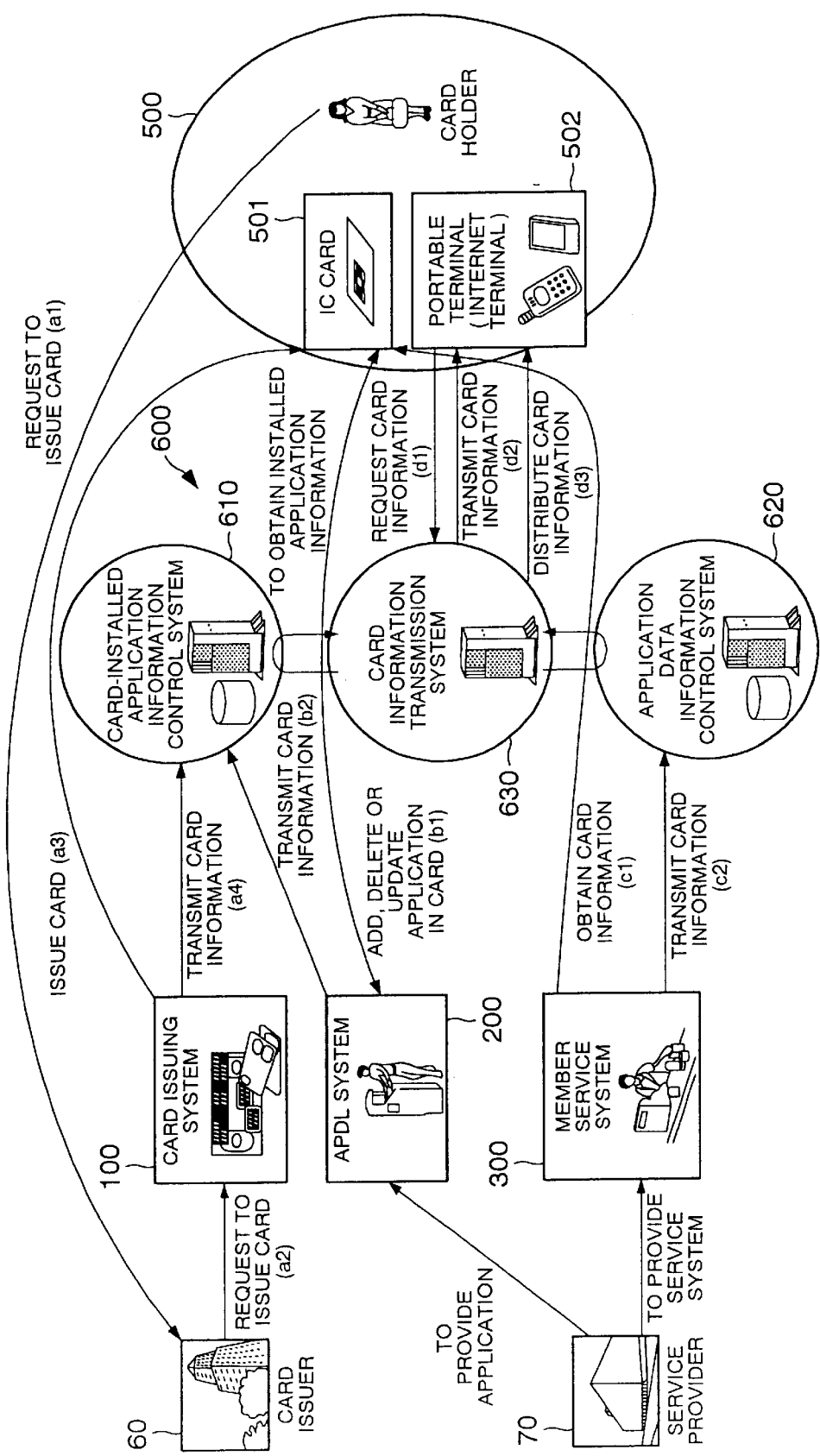
FIG. 9 is a diagram showing another example of the card system of the present invention.

FIG. 9 is a diagram showing another example of the card system of the present invention. A point different from the card system shown in FIG. 2 will now be described.

The difference between the card system shown in FIG. 9 and the card system shown in FIG. 2 is that the card information distribution system 400 constituting the card system shown in FIG. 2 is shown as a centralized type, but on the other hand, the card information distribution system 500 constituting the card system shown in FIG. 9 is shown as a dispersed type.

The card information distribution system 600 shown in FIG. 9 is divided into a card-installed application information control system 610 and an application data information control system 620, and dispersedly arranged.

The card information distribution system 600 shown in FIG. 9 also includes a card information transmission system 630.

To the card-installed application information control system 610, the card information is transmitted from the card issuing system 100 and the APDL system 200, and in the card-installed application information control system 610, correspondence between the card and the application installed in the card is controlled. To the application data information control system 620, the information is transmitted from the member service system 300, and the data of the application in the card is controlled therein.

The card information transmission system 630 obtains installed application information representing which application is installed in the card from the card-installed application information control system 610 via a communication line, according to need, and obtains data of the application in the card from the application data information control system 620, to thereby transmit these information to the portable terminal 502 of the user 500.

One each of the card-installed application information control system 610 and the application data information control system 620 is shown herein, but these are not required to be one each, and a plurality of these systems may be dispersed. Alternatively, the system may not be divided depending on the control, that is, control of the application in the card in the card-installed application information control system 610 and control of data of the application in the card in the application data information control system 620. But the system may be a system for controlling all information related to one application, that is, a control system for controlling which cards this application is installed in, and also controlling the data of the application for each card in which this application is installed may be dispersed for each application.

In either case, the address of the control system is informed to the card information transmission system 630, and the system is constructed such that the card information transmission system 630 receives necessary information from a necessary control system according to need, via a communication line, to thereby transmit the information to the user 500 (portable terminal).

As described above, this card information distribution system can be also dispersed freely within this card system.

What is claimed is:

1. A card system comprising:
   a card issuing system for writing at least card identification information for identifying cards in a card with memory function capable of rewritably holding a plurality of applications;
   a card contents update system for performing addition, deletion and update of an application in the card issued by said card issuing system;
   a card data update system for updating the data of an application held in the card issued by said card issuing system;
   a card information distribution system for receiving information corresponding to the card issued by said card issuing system, from said card issuing system, said card contents update system and said card data update system to control the received information, and transmitting said information corresponding to the card to a destination corresponding to the card; and
   a card information presentation system for presenting the information transmitted from said card information distribution system.

2. A card information presentation apparatus comprising:
   an information receiving section for receiving the information corresponding to a card, which is transmitted from a card information distribution system which receives information corresponding to the card with memory function capable of rewritably holding a plurality of applications to control the received information and transmits said information corresponding to the card to a destination corresponding to the card; and
   an information presentation section for presenting the information corresponding to the card, which is received by said information receiving section.

3. A card information presentation apparatus according to claim 2, comprising:
   an information transmission requesting section for requesting the transmission of information corresponding to the card to said card information distribution system;

said information receiving section receiving the information transmitted from said card information distribution system, in response to the information transmission request from said information transmission requesting section.

4. A card information presentation apparatus according to claim 2, wherein said information receiving section is for receiving information transmitted in accordance with a transmission schedule registered in advance in said card information distribution system.

5. A card issuing apparatus comprising:

a card issuing section for writing at least card identification information for identifying cards, in a card with memory function capable of rewritably holding a plurality of applications; and an information transmission section for transmitting information corresponding to the card having card identification information written therein by said card issuing section toward a card information distribution system which receives the information corresponding to the card to control the received information and transmits said information corresponding to the card to a destination corresponding to the card.

6. A card contents update apparatus comprising:

a card contents update section for performing addition, deletion and update of an application, in a card with memory function capable of rewritably holding a plurality of applications, and having at least card identification information for identifying cards written therein; and an information transmission section for transmitting information representing the update contents of the application in the card updated by said card contents update section, toward the card information distribution system which receives the information corresponding to the card to control the received information and transmits said information corresponding to the card to a destination corresponding to the card.

7. A card data update apparatus comprising:

a data update section for updating the data of an application held in a card with memory function capable of rewritably holding a plurality of applications; and an information transmission section for transmitting information representing the update contents of the application data held in the card updated by said data update section, to the card information distribution system which receives the information corresponding to the card to control the received information and transmits said information corresponding to the card to a destination corresponding to the card.

8. A card information distribution system comprising:

an information control section for receiving the information corresponding to a card with memory function capable of rewritably holding a plurality of applications to control the received information; and an information transmission section for transmitting the information controlled in said information control section to a destination corresponding to the card.

9. A card information distribution system according to claim 8, wherein said information control section comprises a plurality of dispersed parts; and said information transmission section receives the information controlled by each part of said information control section via a communication line, and transmits the information to a destination corresponding to the card.

* * * * *